Dec. 30 1930.    C. ENDORF    1,786,562
HEAT INSULATING DEVICE FOR COOKING UTENSILS
Filed Aug. 17, 1927
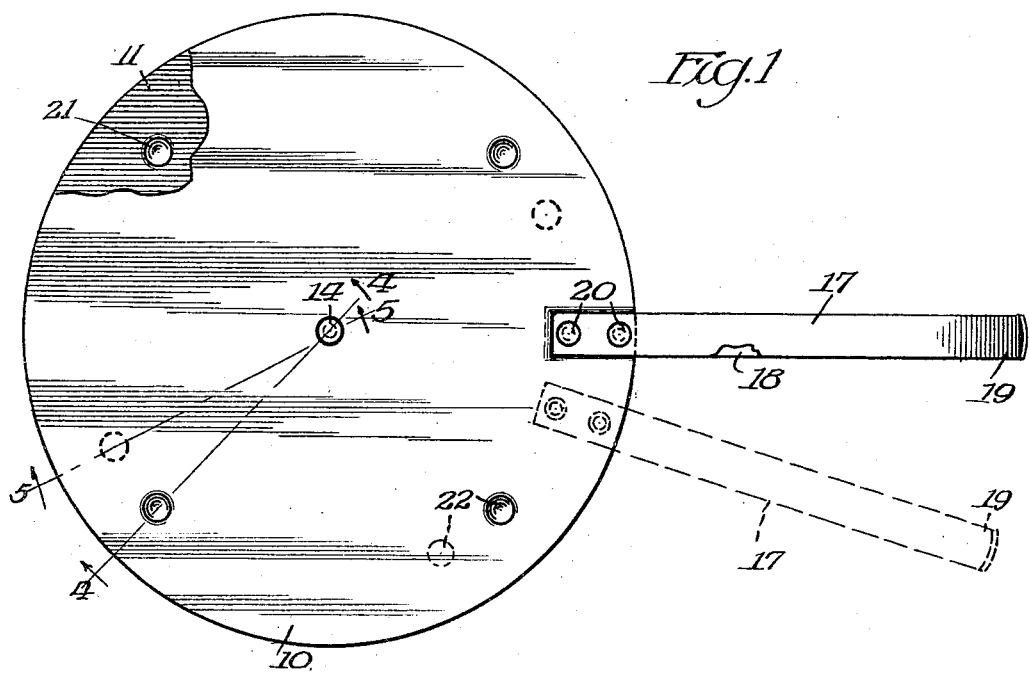
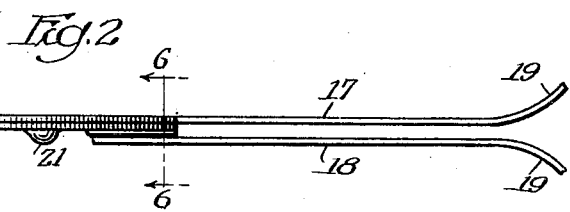
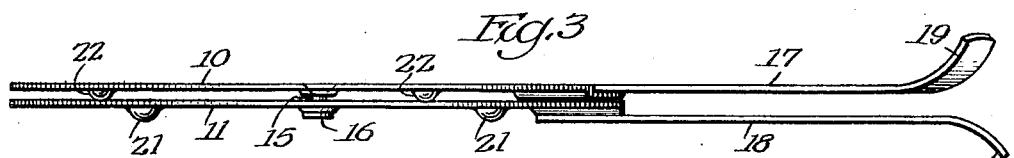
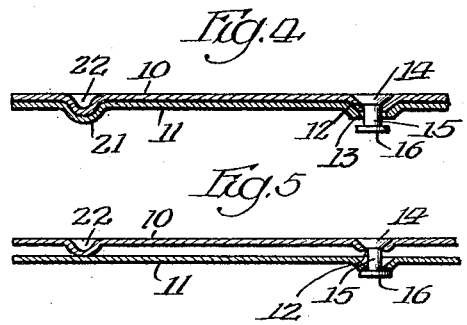
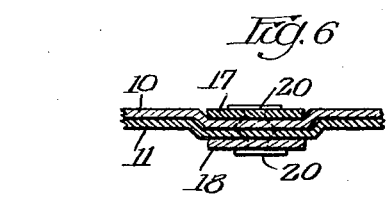
Inventor
Charles Endorf
By Arthur L. Sprinkle
Atty.

Patented Dec. 30, 1930

1,786,562

UNITED STATES PATENT OFFICE

CHARLES ENDORF, OF CHICAGO, ILLINOIS

HEAT-INSULATING DEVICE FOR COOKING UTENSILS

Application filed August 17, 1927. Serial No. 213,487.

This invention relates to improvements in insulating devices and particularly to heat insulating devices of the character adapted for use in connection with cooking utensils or the like.

One object of the present invention is to provide a heat insulating device which may be readily positoned between a cooking utensil or the like and a heating element, such, for example, as an electric grill or the burner of a gas stove, and which may be conveniently manipulated to move the utensil away from the heating element.

Another object of the invention is to provide a heat insulating device wherein the insulating qualities of the device may be readily increased if desired.

Another object of the invention is to provide an insulating device having a plurality of elements so related that they may be conveniently manipulated in a manner to separate the elements with respect to each other to provide an air space therebetween.

A further object of the invention is to provide an insulating device having a plurality of plates adapted to be positioned with respect to each other in a manner to provide, in effect, a single laminated heat insulating unit, the laminations of which may be conveniently separated to provide a plurality of heat insulating mediums between a cooking utensil and a heating element.

A still further object of the invention is to provide a device which is practical, of simple, efficient and durable construction, and which may be economically manufactured.

One embodiment of the invention is shown, for illustrative purposes, in the accompanying drawings, in which—

Fig. 1 is a plan view of the device showing one of the members as having a portion thereof broken away to disclose another member, and shifted to a changed position indicated by dotted lines.

Fig. 2 is a side elevation of the parts shown in Fig. 1.

Fig. 3 is a side elevation of the parts shown in Figs. 1 and 2, illustrating the manner of separating certain portions of the device to provide a heat insulating air space therebetween, and showing the parts in the positions occupied when a portion of the device is shifted to the dotted line position of Fig. 1.

Fig. 4 is a sectional elevation taken on the line 4—4 of Fig. 1.

Fig. 5 is a sectional elevation taken on the line 5—5 of Fig. 1 showing various portions of the device in changed position.

Fig. 6 is a sectional elevation taken on the line 6—6 of Fig. 2.

In the illustrative embodiment of the device shown in the drawing, a pair of plates or discs, constructed preferably of sheet metal, are provided, the upper plate being designated by the numeral 10, and the lower plate by the numeral 11. These plates 10 and 11 are shown provided at or near their central portions with apertures 12 and 13, respectively, the material of the upper plate 10 surrounding the aperture 12 being bent downwardly to form a depression adapted to receive the head 14 of a pivot member 15 in a manner to permit the top of the head 14 to lie flush with the upper surface of the plate 10, and the material of the lower plate 11 surrounding the aperture 13 being bent downwardly to form a depression adapted to receive the downwardly bent portion of the upper plate 10 in a manner to permit said plates to lie closely adjacent each other. The member 15 extends through the apertures 12 and 13 and is provided at its lower end with an enlarged portion 16 sufficiently spaced from the downwardly bent portion of the plate 11 to permit of a limited movement of the plates 11 and 12 with respect to each other longitudinally of the pivot member 15. The plates 10 and 11 are provided also with radially extending handles 17 and 18, respectively, by which the device may be handled, and by which the respective plates 10 and 11 may be shifted angularly with respect to each other about the pivot member 15, as indicated by dotted lines in Fig. 1. The handle 17, in the present instance, is shown seated in a depression formed adjacent the edge of the plate 10 in a manner to permit the top of the handle 17 to lie flush with the upper surface of the plate 10, and a depression formed in the upper face of the plate 11 is adapted to receive the depressed marginal portion of the plate 10 in a manner to permit the adjacent faces of the plate to lie close to or in contact with each other, while the handle portion 18 is secured to the under side of the depressed portion formed adjacent the edge of the plate 11. The handles 17 and 18 may be provided with oppositely bent portions 19 to facilitate the grasping of the respective handles when it is desired to shift one of the plates 10 or 11 with respect to the other.

In the illustrative device, the handles 17 and 18 are shown as secured to the respective plates by means of rivets 20, but it will be obvious that they may be otherwise secured, or, if desired, may be formed integrally with the plates.

To provide means for permitting the plates to lie closely adjacent, or in contact with each other, and for separating or spacing them with respect to each other longitudinally of the pivot member 15, the lower plate 11 is provided, in the present instance, with a plurality of radially disposed annularly spaced portions 21 pressed downwardly from the material of the plate in a manner to form inclined depressions or recesses in the upper face thereof, while the upper plate 10 is provided with a plurality of similar portions 22 pressed downwardly from the material of the plate in a manner to form inclined lugs on the lower face of the plate, the lugs or portions 22 of the plate 10 being so positioned therein that when the handles 17 and 18 of the respective plates and the depressed portions at the margins of the plates are in the same vertical plane, the lugs or portions 22 on the lower face of the plate 10 will register with and occupy a position in the recesses or depressions formed in the portions 21 of the plate 11, thereby permitting the adjacent faces of the respective plates to lie closely adjacent or in contact with each other and providing, in effect, a single laminated heat insulating unit adapted to be positioned between a heating element and a cooking utensil, and in which the upper face thereof presents a smooth or flush surface to the bottom of the utensil, thereby providing stability in the seating of the utensil on the device.

The plates 10 and 11, when in the relationship above described, provide a certain degree of insulation between the heating element and the utensil, but it will be understood, however, that the heat attained by the lower plate 11 will be quite readily transmitted to the upper plate 10, by reason of the close proximity of the plates, and thence to the utensil.

In the event that it becomes desirable to provide greater insulation between the heating element and the utensil, as would be the case when food or other substances in the course of preparation had attained the desired condition induced by its subjection to the heat, and it was desirable to maintain substantially the degree of heat attained by the food or other substances without further heating, the plates 10 and 11 may be separated from each other in a manner to provide an air space therebetween, it being well known that air space is one of the most efficient non-conductors of heat or cold.

To accomplish the separation of the plates and provide the air space, as above described, the plates 10 and 11, and their respective handles 17 and 18 may be shifted with respect to each other, as, for example, in the present instance, the handle 17 and plate 10 may be rotated angularly with respect to the handle 18 and plate 11 about the pivot member 15, thereby carrying the lugs or portions 22 up the inclined surfaces of the depressions or recesses formed in the downwardly pressed portions 21, and onto the upper surface of the plate 11, thus separating the plates 10 and 11 and providing a space therebetween through which the air may circulate, thereby reducing, to a very considerable degree, the transmission of heat from the heating element to the utensil.

It will be observed from the foregoing description that the present invention provides a practicable, efficient, durable and economically constructed heat insulating device, capable of being easily and conveniently manipulated, and wherein, by reason of the handles 17 and 18 extending outwardly from beneath the utensil, the various parts of the device may be adjusted to provide desirable insulation without the necessity of removing the utensil from the device, as, it will be understood that as the plate 10 is lifted from the plate 11 by reason of the camming action between the inclined lugs 22 and the inclined surfaces of the depressions or recesses formed in the portions 21, the utensil resting on the plate 10 will be lifted with the plate.

Obviously, the present invention is not limited to the precise details of construction shown and described, but may be variously modified. Moreover, all the features of the invention need not be used conjointly, as the same may be used to advantage in variously different combinations and sub-combinations.

What I claim as my invention and desire to secure by Letters Patent is:

1. A device of the class described, comprising a plurality of rotatably related plates, one of said plates having a plurality of annularly spaced depressions formed therein, a plurality of annularly spaced lugs formed on the other of said plates and adapted to register with said depressions in a manner to permit the adjacent faces of said plates to contact each other a pivot member operatively related to and connected with said plates, and means associated with said plates for relatively shifting the plates angularly with respect to each other in a manner to move said lugs out of said depressions for separating the adjacent faces of said plates and providing an air space therebetween.

2. A device of the class described, comprising a plate having a plurality of annularly spaced depressions formed therein, a second plate having a plurality of annularly spaced lugs formed thereon and adapted to register with said depressions in a manner to permit the adjacent faces of said plates to lie in close proximity to each other, an elongated pivot member connecting the said plates adjacent their central portions, said plates having depressions formed therein adjacent their edge portions and adapted to register with each other when said lugs are in registry with said annularly spaced depressions, and means carried by said plates for moving the plates angularly with respect to each other about said pivot member in a manner to move said lugs out of register with said first mentioned depressions and on to the face of said first mentioned plate, thereby separating the adjacent faces of said plates and providing an air space therebetween.

3. A device of the class described, comprising a sheet metal plate having a plurality of radially disposed uniformly spaced depressions formed in the upper face thereof, a second sheet metal plate having a plurality of radially disposed uniformly spaced lugs formed on its lower face and adapted to register with said depressions in a manner to permit the adjacent faces of said plates to contact each other, an elongated pivot member connecting said plates adjacent their central portions, said plates having radially extending depressions formed therein adjacent their edge portions and adapted to register with each other when said lugs are in register with said radially disposed uniformly spaced depressions, and handles carried by said plates and projecting radially from said radially extending depressions for moving the plates angularly with respect to each other about said pivot member in a manner to move said lugs out of register with said first mentioned depressions and on to the face of said first mentioned plate, thereby separating the adjacent faces of the plates and providing an air space therebetween.

4. A heat insulating device for cooking utensils comprising a plurality of co-operably related plates, means for permanently connecting said plates together to have pivotal relation with each other, one of said plates having a plurality of recesses formed therein, a plurality of lugs carried by the other of said plates and adapted to engage said recesses in a manner to permit the adjacent faces of said plates to substantially contact with each other in one position of adjustment, and means associated with said plates for relatively shifting the plates with respect to each other in a manner to move said lugs out of said recesses whereby to separate the adjacent faces of said plates and providing an air space therebetween in other positions of adjustment.

5. A heat insulating device for cooking utensils comprising a plurality of plates having corresponding recesses and projections formed on their adjacent faces for permitting said plates to lie close to each other, there being co-operating angular surfaces adjacent said corresponding recesses and projections whereby when said plates are shifted in relation to each other a wedging action will occur to separate said plates, a pivot member operatively related to and connecting said plates whereby they may have pivotal movement in relation to each other, and means carried by said plates and extending radially therefrom and adapted to be grasped by an operator for shifting said plates about said pivotal member relatively of each other in a manner to separate the plates when desired to provide an air space therebetween.

In testimony whereof I have signed my name to this specification, on this 9th day of August, A. D. 1927.

CHARLES ENDORF.